Patented Mar. 28, 1944

2,345,463

UNITED STATES PATENT OFFICE 2,345,463

ARTICLE OF FOOD AND PROCESS OF MAKING THE SAME

Robert R. Cox, La Junta, Colo.

No Drawing. Application June 25, 1943,
Serial No. 492,304

6 Claims. (Cl. 99—107)

This invention relates to an article of food and process of making the same from smoke-cured skins or rinds, and it is primarily an object of the invention to provide a process of this kind wherein the skin or rind is rendered in its own lard, thereby retaining the entire smoke flavor and resulting in a highly savory food product.

It is also an object of the invention to provide a process of crackling skin or rind for the production of a novel article of food, which does not soften or tenderize such skin or rind but which contracts and expands the inner cells of the skin or rind to a dry crisp, stabilized condition to insure against contraction of the skin or rind to a non-explodable condition no matter how long the rendered skin or rind may set after the rendering process.

An additional object of the invention is to provide a process of this kind, for the production of a novel article of food, embodying the initial step of rendering the skin or rind in its own lard, together with a second step of dry exploding the rendered skin or rind.

The process is particularly intended for operation upon smoked bacon skin or rind of any size or shape and of a light, medium or dark smoke-cure or smoke and spice cure. It is preferred, however, that the skin or rind be closely peeled from the bacon slab, as closely peeled skin or rind is freed to a greater degree of fat content. However, this is not essential as the initial step of rendering the skin or rind frees the same from all fat.

While the skin or rind may be employed in the process in a single piece as peeled from the bacon slab, yet in order to obtain a neat finished food product, the skin or rind is preferably sliced from one-quarter to three-quarters of an inch across the full width of the skin or rind as it comes from the slab.

The skin or rind as a whole or the slices are placed in an open top kettle of desired volume or capacity and there is also placed in the kettle lard or other type oil or shortening of a depth of approximately two inches, lard being preferred. This charge of lard or the like in the kettle is subjected to a very low rate of heat which at no time should exceed 300° F. nor should such lard or the like be permitted to cool less than 180° F. The bacon skin or rind or slices are placed in the kettle after the lard or the like has been heated between 180° F. and 300° F. but the quantity of the skin or rind or slices put within the kettle should not exceed one-half the capacity or volume of the kettle.

If the skin or rind is sliced, the same will start to render substantially instantaneously and this first step renders the entire lard from the skin or rind and at the same time contracts and expands the cellular structure of the skin or rind but does not shrink the skin or rind in any manner at any time but, on the contrary, continually enlarges the same as the cells begin to expand in the rendering lard.

When the skin or rind begins to crack and pop, it must be turned over so that all portions of the skin or rind can come in contact with the rendering lard. With the temperature of the lard within the range hereinbefore set forth, the complete operation of expanding will require only approximately fifteen minutes.

As the skin or rind begins to expand, it will take on a highly bubbled appearance and will become light in color and as the skin expands, it will fill the kettle fuller and fuller. It is for this reason that it is important that in the beginning the kettle should not be filled with the bacon skin or rind for more than one-half its volume.

When the skin or rind appears even in texture, it is ready to be removed from the kettle to drain off the excess melted hot lard. This can be easily accomplished by the use of screen wire or some preferred type of drain rack. When the skin or rind has completed draining, it will be cooled and will become crisp and brittle so that it will easily break. Furthermore, as soon as the air hits the skin or rind it will become entirely dry and practically free from all lard or oil.

The skin or rind is rendered by this initial step of the process is now ready to be subjected to the step of explosion. However, it is not necessary to proceed at once with such explosion step as the rendered skin or rind can be packaged and stored away for a considerable period of time without softening or deteriorating.

The rendered skin or rind is exploded within an open top kettle which, before the skin or rind is placed therein, should have on its bottom a covering of lard of from five to eight inches in depth depending, of course, upon the size of the kettle. This lard is heated and maintained at a temperature not to exceed 410° F. or less than 375° F.

The skin or rind is then placed in the exploding kettle and the amount of the rendered skin or rind or cracklings placed in the exploding kettle should not be more than the kettle will accommodate. Immediately upon coming into contact with the heated lard, the skin or rind or cracklings will at once start to explode and the cracklings should be stirred so that each and all may come in contact with the hot lard or oil. During this time the cracklings will become golden in color and will cease popping, whereupon the cracklings are removed from the kettle so that the intensely heated lard will not burn the same. The removed cracklings are then drained and as soon as the air strikes the same, the exploded cracklings become cool and dry, after which they are salted and ready for consumption.

It is to be particularly pointed out that in the process as herein set forth, no water or steam cooking is employed and as the lard used is initially full of the smoke flavor of the bacon slab, such lard naturally will further impart such flavor to the cracklings in all operations, thus assuring a superior product, full in food value. The resultant food product is also so tender that it can be easily eaten by persons of all ages.

It is to be stated that in referring to the bacon skin or rind, there is to be included any number of such skins or rinds either as a whole or sliced but it is preferred that they be sliced and particularly in the exploding step.

It is also to be understood by reference to lard or the like is meant the material as initially rendered from the skin or rind.

What is claimed is:

1. The process of preparing edible meat skins and rind substances, which comprises contacting the substance with an oil heated to a temperature sufficient to bring about the slow expansion of the cellular structure of the substance, then removing the substance from contact with the heated oil after such cellular expansion has progressed to the stage of imparting a bubbled appearance to the substance, draining off the oil, afterward contacting the substance with oil heated to a materially higher degree sufficient to cause the violent rupturing of the expanded cells, separating the substance from the oil following such rupturing to prevent burning, and then draining the oil from the substance.

2. The process of preparing edible meat skin and rind substances, which comprises contacting the substance with an oil heated to a temperature sufficient to bring about the slow expansion of the cellular structure of the substance, then removing the substance from contact with the heated oil after such cellular expansion has progressed to the stage of imparting a bubbled appearance to the substance, draining off excess oil, allowing the substance to become cool, afterwards contacting the cooled substance with oil heated to a materially higher degree sufficient to cause the violent rupturing of the expanded cells, separating the substance from the oil following such rupturing to prevent burning, and then draining the oil from the substance.

3. The process of preparing edible meat skin and rind substances, which comprises contacting the substance with an oil heated to a temperature not exceeding 300° F. to bring about the slow expansion of the cellular structure of the substance, then removing the substance after such cellular expansion has imparted a bubbled appearance thereto, draining off excess oil, afterwards contacting the substance with oil heated to not less than 375° F. to effect the violent rupturing of the expanded cells, separating the substance from the oil following such rupturing to prevent burning, and then draining the oil from the substance.

4. The process of preparing edible meat skin and rind substances, which comprises cutting the rind into small pieces, contacting the pieces with an oil heated to at least 180° F. and not more than 300° F., retaining the pieces in contact with the heated oil until the cells expand to a degree to give a bubbled appearance and a light color to the pieces, then removing the pieces from contact with the oil and draining the oil therefrom, afterwards contacting the expanded pieces with oil heated to at least 375° F. and not more than 410° F. and effecting thereby violent rupturing of the cells and the puffing of the pieces, removing the pieces from contact with the oil after the cells have ruptured, to prevent burning, and finally draining off the oil from the pieces.

5. As a new article of food, cooked puffed animal rind in which the cells are greatly expanded whereby the thickness of the rind is greatly increased and the rind structure between the cells is thin, light in texture and color, and brittle.

6. A new article of food, comprising pieces of smoked pork rind puffed up to a thickness materially greater than the normal thickness of the rind and in which the cells are expanded and in part ruptured, the structure of the rind between the expanded cells being thin and light in texture, the pieces being light in color and having the appearance both of being dry and free of greasiness.

ROBERT R. COX.